US010661982B2

(12) United States Patent
Eisenman et al.

(10) Patent No.: US 10,661,982 B2
(45) Date of Patent: May 26, 2020

(54) SYSTEMS AND PROCESSES FOR SPACE MANAGEMENT OF THREE DIMENSIONAL CONTAINERS

(71) Applicant: Spacemaptech, LLC, Boise, ID (US)

(72) Inventors: Michael Eisenman, Boise, ID (US); Evanson G. Baiya, Meridian, ID (US); Marcus Allen Craig Lyons, Nampa, ID (US); Jeffrey A. Thompson, Boise, ID (US)

(73) Assignee: SPACEMAPTECH, LLC, Boise, ID (US)

( * ) Notice: Subject to any disclaimer, the term of this patent is extended or adjusted under 35 U.S.C. 154(b) by 0 days.

(21) Appl. No.: 16/040,861

(22) Filed: Jul. 20, 2018

(65) Prior Publication Data

US 2020/0024071 A1     Jan. 23, 2020

(51) Int. Cl.
*B65D 90/48* (2006.01)
*G06Q 10/08* (2012.01)
*G01G 23/37* (2006.01)
*G06Q 50/28* (2012.01)
*G01G 19/52* (2006.01)

(52) U.S. Cl.
CPC ......... *B65D 90/48* (2013.01); *G01G 23/3735* (2013.01); *G06Q 10/0833* (2013.01); *G06Q 50/28* (2013.01); *B65D 2590/0083* (2013.01); *G01G 19/52* (2013.01)

(58) Field of Classification Search
CPC ........... B65D 90/48; B65D 2590/0083; G01G 23/3735; G01G 19/52; G06Q 10/0833; G06Q 50/28
See application file for complete search history.

(56) References Cited

U.S. PATENT DOCUMENTS

| 2014/0104413 | A1* | 4/2014 | McCloskey | G06Q 10/083 348/135 |
| 2014/0229501 | A1* | 8/2014 | Josefiak | G06Q 10/08 707/769 |
| 2016/0239792 | A1* | 8/2016 | Burch, V | G06F 16/254 |
| 2018/0075547 | A1* | 3/2018 | Pere | G06Q 10/1097 |
| 2018/0315111 | A1* | 11/2018 | Alvo | G01G 19/4144 |
| 2018/0374039 | A1* | 12/2018 | Walden | H04W 4/35 |

* cited by examiner

*Primary Examiner* — Mohamed Barakat
(74) *Attorney, Agent, or Firm* — Parsons Behle & Latimer

(57) ABSTRACT

Systems and methods for remote monitoring of a container are disclosed. The system includes at least one data collector configured to collect data corresponding to a physical attribute of the container, a wireless transmitter in communication with the at least one data collector and configured to transmit the data corresponding to a physical attribute of the container to a location remote from the location of the container, a server in communication with the wireless transmitter to receive and process the data corresponding to a physical attribute of the container, and a physical attribute analysis engine in communication with the server to receive the data corresponding to a physical attribute of the container and calculate a current value for the physical attribute based upon the received data.

12 Claims, 13 Drawing Sheets

| Label | Field | Values |
|---|---|---|
| 410 | Container size (ft-in) | Length / Width / Height |
| 412 | Serial No | NONE |
| 414 | Transmitter Serial No | |
| 416 | Location (Name) | |
| 418 | Devices | Camera / Scale / Other |
| 420 | Serial No | |
| 422 | Data Report | Hourly / Nightly / Realtime |
| 424 | Fill Level Alarms | 60% / 85% / 90% |
| 426 | Other Alarms | Door Open >12hours / No Activity >48hours |
| 428 | Notify (Phone + Email) | ........@spacemap.... |
| 430 | Commission by | ........@spacemap.... |
| 432 | Objects Expected (Describe) | |
| 434 | Commission Date | __/__/__ |

FIG. 4b

SYSTEMS AND PROCESSES FOR SPACE MANAGEMENT OF THREE DIMENSIONAL CONTAINERS

FIELD OF THE DISCLOSURE

The invention relates generally to the field of logistics, and in particular to systems and methods for space mapping of three-dimensional containers.

COPYRIGHT NOTICE/PERMISSION

Portions of the disclosure may contain material which is subject to copyright protection. The copyright owner has no objection to the facsimile reproduction by anyone of this disclosure as it appears in the Patent and Trademark Office patent file or records, but otherwise reserves all copyright rights whatsoever. The following notice applies to the software and data as described below and in the drawings hereto: Copyright© 2018, Spacemaptech, LLC, All Rights Reserved.

BACKGROUND

Space planning in containers is a critical function for effective logistics. As used herein, "containers" means any sort of intermodal shipping container, such as those meeting standards such as ISO 668, ISO 1496-1, or similar standards, trash or recycling "dumpsters," cages, crates, vessels, freight train cars, truck beds, truck trailers, ship holds, aircraft holds, warehouses, storage units, barns, buildings, or other containers generally used for containing materials. Space planning enables the logistics stakeholders identify when, what, where, and how to place specific loads. Without proper planning, containers, aircraft, trucks, and ships run the risk of costly shipment, regulatory and health risk due to fixup of goods, and losses in revenue opportunity. It is therefore imperative that every logistics/shipping container or vehicle space is optimized.

Space planning is difficult without a way to measure and evaluate the nature of the space. Some space mapping techniques are known; however, there is need to have faster, more accurate and virtual systems and methods. For example, if there was a remotely located container currently, someone would have to guess how much space is available in that container, or manually go to the container and make the physical measurement. Thus, there is a need for a system that will take into account the variety of physical spaces and provide real-time data and with an easy-to-use data analysis to enable faster and insightful decision making. Other needs exist, as well as other drawbacks and inconveniences of existing systems and methods.

SUMMARY

Accordingly, the disclosed systems and methods address the above, and other, needs, drawbacks, and inconveniences. Disclosed embodiments address current problems by combining a unique design that incorporates the different hardware components inside the container, a data transmitter, server, and software to deliver a set of capabilities. For example, disclosed embodiments enable (1) feedback and looping between data collectors and associated servers, (2) messaging to the human users of either the container or the objects inside the container, (3) accurate mapping of space inside the container, (4) tracking the physical location of the containers, (5) regulation of conditions inside the container including temperature, humidity, weight, lighting, air-quality, or the like, (6) control activities inside the containers such as locking and unlocking, (7) accurate of identification of objects within the container, (8) accurate load sizing inside the container, and (8) proactive and reactive troubleshooting of events inside the containers. For example, if the power to the container fails, embodiments of the system can message predetermined person(s) that the power has failed and, in some cases, the system can self-diagnose and recommend a remedy, or perform a remedy itself, either via fail-safe, restart, power conservation, or the like.

Disclosed embodiments include a system for remote monitoring of a container, the system having at least one data collector configured to collect data corresponding to a physical attribute of the container, a wireless transmitter in communication with the at least one data collector and configured to transmit the data corresponding to a physical attribute of the container to a location remote from the location of the container, a server in communication with the wireless transmitter to receive and process the data corresponding to a physical attribute of the container, and a physical attribute analysis engine in communication with the server to receive the data corresponding to a physical attribute of the container and calculate a current value for the physical attribute based upon the received data.

Further disclosed embodiments include a display engine module in communication with the physical attribute analysis engine that receives the current value for the physical attribute and forwards the current value to at least one predetermined web address.

In some embodiments, the at least one data collector is a camera. In still further embodiments, the camera further includes an optical distance measurement sensor configured to measure a linear distance to an object in a field of view of the camera, and the data corresponding to a physical attribute of the container includes at least one measurement of the linear distance. In still further embodiments, the physical attribute analysis engine has an object identifier module that compares the at least one measurement of the linear distance to a stored value corresponding to an empty container distance, and a capacity calculator that computes the occupied volume of the container based at least in part on the comparison result of the object identifier.

In further disclosed embodiments, the system includes a second camera comprising an optical distance measurement sensor configured to measure a linear distance to a second object in a field of view of the second camera, and the data corresponding to a physical attribute of the container further comprises the measurement of the linear distance to the second object.

In further disclosed embodiments, the physical attribute analysis engine includes an object identifier module that compares the at least one measurement of the linear distance, and the measurement of the linear distance to the second object, to a stored value corresponding to an empty container distance, a triangulation module that determines the location of the object by combining at least one measurement of the linear distance and the measurement of the linear distance to the second object, and a capacity calculator that computes the occupied volume of the container based at least in part on the comparison result of the object identifier and the determined result of the triangulation module.

In some embodiments, the at least one data collector is a scale. In further disclosed embodiments, the scale measures a weight of the container and the data corresponding to a physical attribute of the container is at least one measurement of the container weight. In still further disclosed embodiments, the physical attribute analysis engine further includes a weight calculator that calculates of the combined weight of the container and contents by lookup of the weight limits for the specified space, and an alarm module that signals an alarm if the weight of the contents exceeds a threshold value.

In further disclosed embodiments, the at least one data collector is a biometric sensor. In still further embodiments, the biometric sensor captures images associated with biological traits, and the data corresponding to a physical attribute of the container further comprises at least one measurement of the biological trait. In some embodiments, the biological traits include: light, temperature, velocity, electrical capacity, and sound. In some embodiments, the biometric sensor captures energies that are associated with biological traits, and the data corresponding to a physical attribute of the container further comprises at least one measurement of the biological trait. In still further embodiments, the physical attribute analysis engine includes a biometric analysis engine that identifies the biological traits based on the captured images by lookup of images and comparison with existing traits in a database, and an alarm module that triggers an alarm if the identified biological traits meet a threshold. In still further embodiments, the system includes a verification engine that verifies a living system based on the biological traits.

In further disclosed embodiments, the at least one data collector further comprises a global positioning system (GPS). In still further disclosed embodiments, the physical attribute analysis engine includes a real-time position location module in communication with the GPS for locating the geographical position of the container. In still further embodiments, the physical attribute analysis engine includes a timing module for timing of events inside the container and providing a time-stamp.

In further disclosed embodiments, the at least one data collector is a diagnostic device. In still further disclosed embodiments, the physical attribute analysis engine includes a diagnostic analysis engine that receives data from the diagnostic device and processes the data to deliver a result related to conditions within the container. In still further disclosed embodiments, the diagnostic device is a thermometer and the data from the diagnostic device represents a temperature, and the result related to conditions within the container further comprises an assessment of potentially hazardous temperature conditions within the container. In still further disclosed embodiments, the diagnostic device further comprises an oxygen sensor and the data from the diagnostic device represents an oxygen level, and the result related to conditions within the container further comprises an assessment of potentially hazardous oxygen levels within the container. In still further disclosed embodiments, the diagnostic device further comprises a carbon monoxide sensor and the data from the diagnostic device represents a carbon monoxide level, and the result related to conditions within the container further comprises an assessment of potentially hazardous carbon monoxide levels within the container.

In further disclosed embodiments, the physical attribute analysis engine includes an image recognition module for identifying objects inside the container based on images collected by the camera.

Further disclosed embodiments include a portable collector device for determining the volume capacity of a container. The portable device includes a camera configured to collect images related to the container, a GPS to collect information related to the position of the portable device on Earth, a processor containing a physical attribute analysis engine that receives information related to the collected images and position of the portable device, and an input/output interface.

Further disclosed embodiments include a memory for storing the collected images and the information related to the position of the portable device. In still further disclosed embodiments, the portable collector device includes a transceiver for transmitting and receiving information.

Also disclosed is a method for determining the volume capacity of a container, the method including receiving data corresponding to a physical attribute of the container, calculating a current value for the physical attribute based upon the received data, and displaying the current value for the physical attribute.

In further disclosed embodiments, the received data is images from a camera. In still further disclosed embodiments, the method includes optically measuring a linear distance to an object in a field of view of the camera, and the data corresponding to a physical attribute of the container further comprises at least one measurement of the linear distance. In still further disclosed embodiments, the method includes comparing the at least one measurement of the linear distance to a stored value corresponding to an empty container distance, and calculating the occupied volume of the container based at least in part on the comparison result.

In still further disclosed embodiments, the method includes optically measuring a linear distance to a second object in a field of view of a second camera, and the data corresponding to a physical attribute of the container further comprises the measurement of the linear distance to the second object. In still further disclosed embodiments, the method includes comparing the at least one measurement of the linear distance, and the measurement of the linear distance to the second object, to a stored value corresponding to an empty container distance, determining the location of the object by combining at least one measurement of the linear distance and the measurement of the linear distance to the second object, and computing the occupied volume of the container based at least in part on the comparison result and the determined location.

In further disclosed embodiments, the received data is a weight measurement from a scale and the method includes calculating the combined weight of the container and contents by lookup of the weight limits for the specified space, and triggering an alarm if the weight of the contents exceeds a threshold value.

In further disclosed embodiments, the method includes capturing data associated with biological traits within the container, and the data corresponding to a physical attribute of the container further comprises at least one measurement of the biological trait. In still further disclosed embodiments, the biological traits include: light, temperature, velocity, electrical capacity, and sound.

In further disclosed embodiments, the method includes identifying the biological traits based on the captured data by lookup of images and comparison with existing traits in a database, and triggering an alarm if the identified biological traits meet a threshold. In still further embodiments, the method includes verifying a living system based on the biological traits.

In further disclosed embodiments, the method includes communicating with a GPS to locate the geographical position of the container. In still further embodiments, the method includes timing events inside the container and providing a time-stamp.

In further disclosed embodiments, the method includes receiving data from a diagnostic device and processing the data to deliver a result related to conditions within the container. In still further embodiments, the diagnostic device is a thermometer and the data from the diagnostic device represents a temperature, and the result related to conditions within the container further comprises an assessment of potentially hazardous temperature conditions within the container. In still further embodiments, the diagnostic device is an oxygen sensor and the data from the diagnostic device represents an oxygen level, and the result related to conditions within the container further comprises an assessment of potentially hazardous oxygen levels within the container. In still further embodiments, the diagnostic device is a carbon monoxide sensor and the data from the diagnostic device represents a carbon monoxide level, and the result related to conditions within the container further comprises an assessment of potentially hazardous carbon monoxide levels within the container. In still further embodiments, the method includes identifying objects inside the container based on images collected by the camera.

Other advantages, efficiencies, and benefits of disclosed systems and methods also exist.

BRIEF DESCRIPTION OF THE DRAWINGS

FIG. 4b schematically illustrates some configuration parameters related to the flowchart shown in FIG. 4a in accordance with disclosed embodiments.

Figure 1:
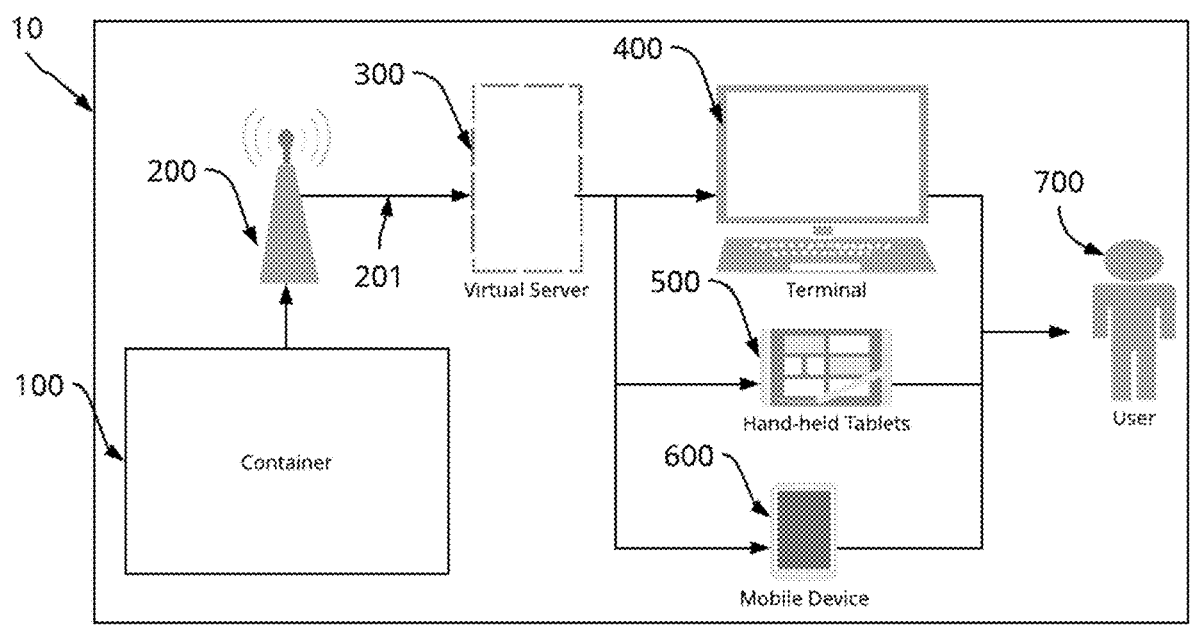
FIG. 1 schematically illustrates a container space mapping system in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 schematically illustrates a container space mapping system 10 in accordance with disclosed embodiments. As shown, system 10 may include a container 100, a transmitter 200, a server 300 in communication with one or more computing devices such as terminal 400, tablet 500, or mobile device 600 that may be used by a user 700.

Figure 2:
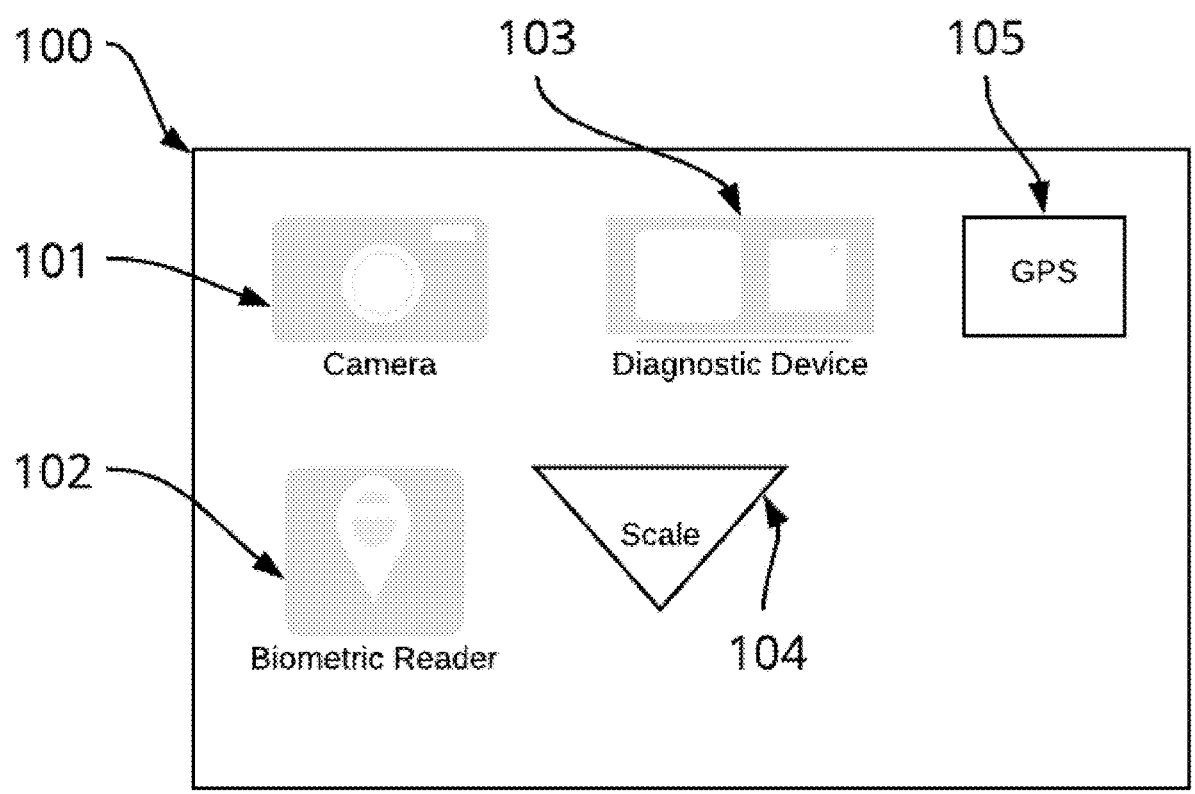
FIG. 2 schematically a representative container and data collection capabilities in accordance with disclosed embodiments.
Figure 3:
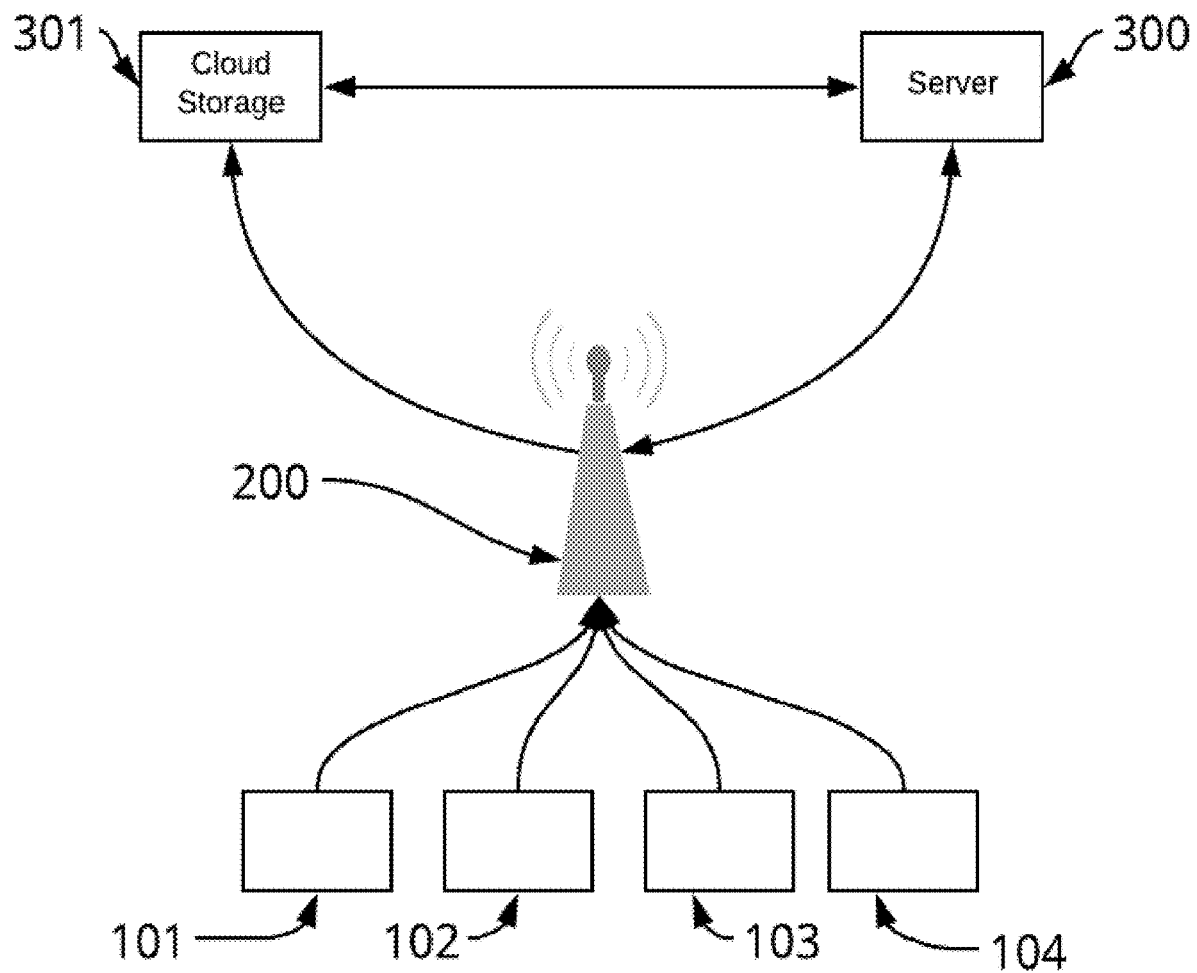
FIG. 3 schematically illustrates a representative of the data flows from data collectors to the cloud storage and a server in accordance with disclosed embodiments.

As shown in FIG. 2, the container 100 is equipped with some combination of cameras 101, biometric readers 102, diagnostic devices 103, scale 104, GPS 105, and/or other sensors (as used herein, collectively and individually, "data collector(s)") which are placed in different parts of the container 100. The biometric readers 102 have sensors such as high definition cameras, infrared cameras, ultrasound devices, sub-dermal imaging devices, and other detectors. Diagnostics devices 103 may include magnetic resonance imaging apparatuses, temperature sensors, or the like.

The data collectors are able to recognize objects shapes, weigh objects, capture odors, measure temperatures, as well as capture color of the objects which is then transmitted for analysis (output of data collectors). Additionally, the data collectors can be used to provide environmental parameters such as the captured temperatures, sound, weights, etc. They provide feedback back to the container 100 user 700 such as in the case of overweight or wrong objects into the container among other functionalities (data collectors as regulators). All the activities inside the container 100 is captured and recorded in form of pictures or video. The cameras 101 or other data collectors can be used to collect sound-related data as well, such as recording and transmitting any audible noises from within container 100.

In one application, camera 101 is a Logitech web-cam C920 which is has the ability to capture a clear picture. Then, based on set configuration of specific intervals or via real-time the data is transmitted to the server 300 through the transmitter 200 for storage and analysis.

In another application, the camera 101, GPS 105, and transmitter 200, may be combined in single device such as a mobile phone. One example is the use of Samsung Galaxy J1 or Blue advance 4.0 to both function as a data collector to collect the data and transmitter 200 to transmit the data to the server 300.

Embodiments of transmitter 200, which can be placed inside or outside the container 100, are used to communicate the data collected and stored in each of the data collectors to a server 300 through a network 201. Network 201 may be wireless (e.g., cellular, Wi-Fi, etc.), wired, or a combination. The transmitter 200 may be powered by connecting to power in the existing grid, or via other sources of power such as batteries, solar, wind, bio-gas, among others. Embodiments of transmitter 200 may have dual functionality; sending the data to the server 300 and processing data and commands that can be forwarded back to the data collectors for regulation or maintenance reasons. The data may be encrypted during the transmission process and in storage 301.

Embodiments of server 300 are composed of computing devices, databases, associated software and firmware, and appropriate network communication devices. Server 300 may comprise a stand-alone or distributed system. The server 300 is also equipped with the herein disclosed proprietary space management analysis engine 306 which has a calculator and algorithms to organize, analyze, and actualize the data received from the container 100. The analysis engine 306 enables all the decisions making parameters which are used to make the sense of the data after the calculations and analysis. The analysis engine 306 output can be displayed graphically on the terminal 400, on mobile devices 600, or other devices (e.g., tablet 500) that are compatible with such output.

Figure 4A:
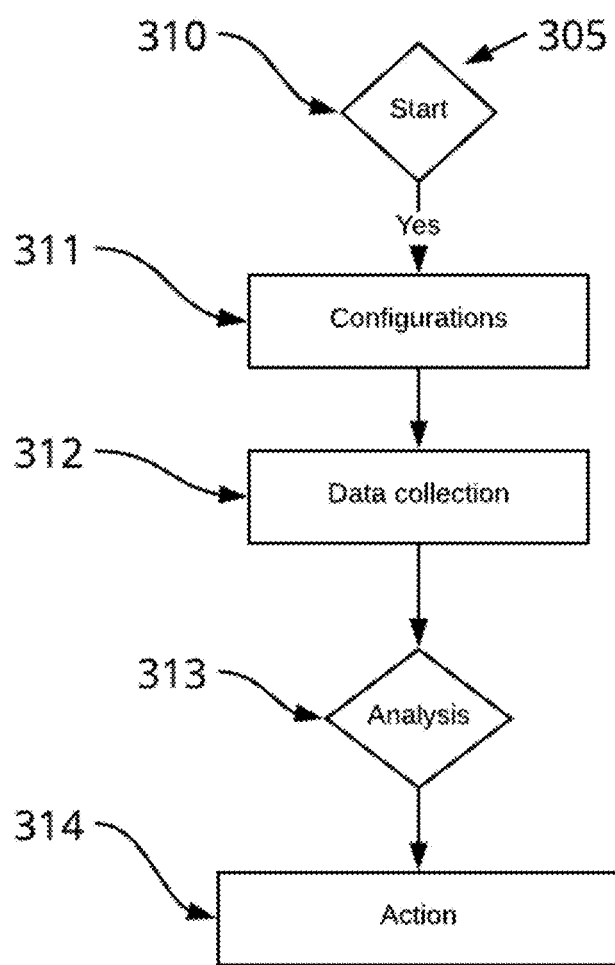
FIG. 4a is an exemplary flowchart showing an embodiment of the system setup in accordance with disclosed embodiments.

FIG. 4a is an exemplary flowchart showing an embodiment of the system 10 setup in accordance with disclosed embodiments. The user 700 starts process 305 as indicated at 310 by authentication to into the backend (e.g., server 300) via any of the output devices, such as terminal 400, tablet 500, or mobile device 600, and starts by setting some initial configurations 311.

Examples of the configurations 311 to be set are schematically illustrated on FIG. 4b and may include container 100 details such as container size 410, container serial number 412, transmitter serial number 414, location name 416, type of data collector device, type of the collector device 418 and serial numbers 420 for the same, data reporting intervals 422, settings for container 100 space fill level alarms 424, other notification parameters or alarms 426 (such as notify when a certain space is occupied or if the door stays unlocked for certain amount of time), project owner or point of contact 428, project owner's contact information 430, types of objects 432 expected in the container 100, and commission date 434, as diagrammatically illustrated in FIG. 4a. The foregoing listing of settings and parameters (as shown in FIG. 4b) is merely exemplary, and other settings or parameters, such as data collection intervals, data transfer intervals, and other parameters may also be used.

Returning to process 305, upon configuration 311, data collection may begin as indicated at 312. Part of data collection 312 may include a connectivity test to ensure that the transmitter 200 is working, the data collectors (e.g., 101-105) are turned on, and that there is data flow from the data collectors (e.g., 101-105) to the storage 301. Embodiments of storage 310 may be distributed storage (e.g., cloud-based), stand-alone storage, or a combination of storage types. As the data is being collected from the container 100, analysis engine 306 performs analysis as indicated at 313. Analysis 313 of the data may be carried out continuously, at predetermined intervals, or as otherwise desired, and insights from the data may be graphically displayed on the user's 700 computer terminal 400, a tablet device 500 or the mobile phone 600 which has the software installed, an exemplary user interface 118 of which is as illustrated in FIG. 5a.

Figure 5A:
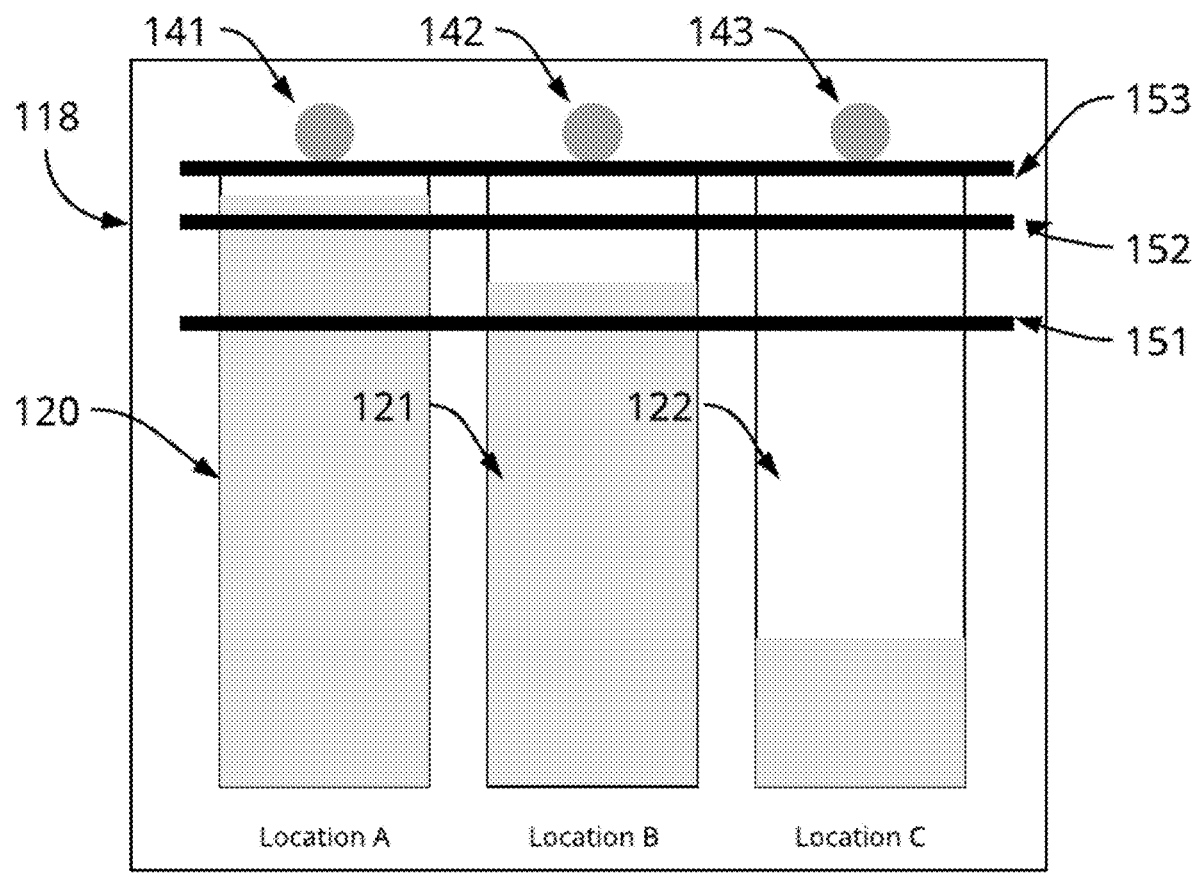
FIG. 5a schematically illustrates a representative of graphical presentation of analyzed data in accordance with disclosed embodiments.

With reference to FIG. 5a, there are three containers 120, 121, 122 being tracked in this example, each in different locations (e.g., locations A, B, and C). As discussed above, settings for some configurations 311 have been configured to indicate when any of the containers (120, 121, 122) reach 60% full as indicated by line 151, 85% full as indicated by line 152, and 95% full as indicated by line 153. Of course, other percentage full levels may also be set, as well as other "alarm" conditions as disclosed herein. When a container's capacity is below 60%, there is a graphic indicator (e.g., a green light) as shown at 143. When a container is 60%-85% full, another graphic indicator (e.g., a yellow light) is displayed as shown at 142, and if a container is over 85% full, a third graphic (e.g., a red light) may be displayed as shown at 141.

In this manner, the interface 118 is very easy to use and it helps the users 700 easily understand what is happening with each container 100. This interface 118 is complementary to the messages that also may be sent to users 700 when space limits are met, or alarms are triggered. Using a real-time data feed, the user 700 is able to see how much space is left in the container 100 from a graphical interface 118 which enables them to make the appropriate decisions such as pickup, exchange, etc.

Figure 5B:
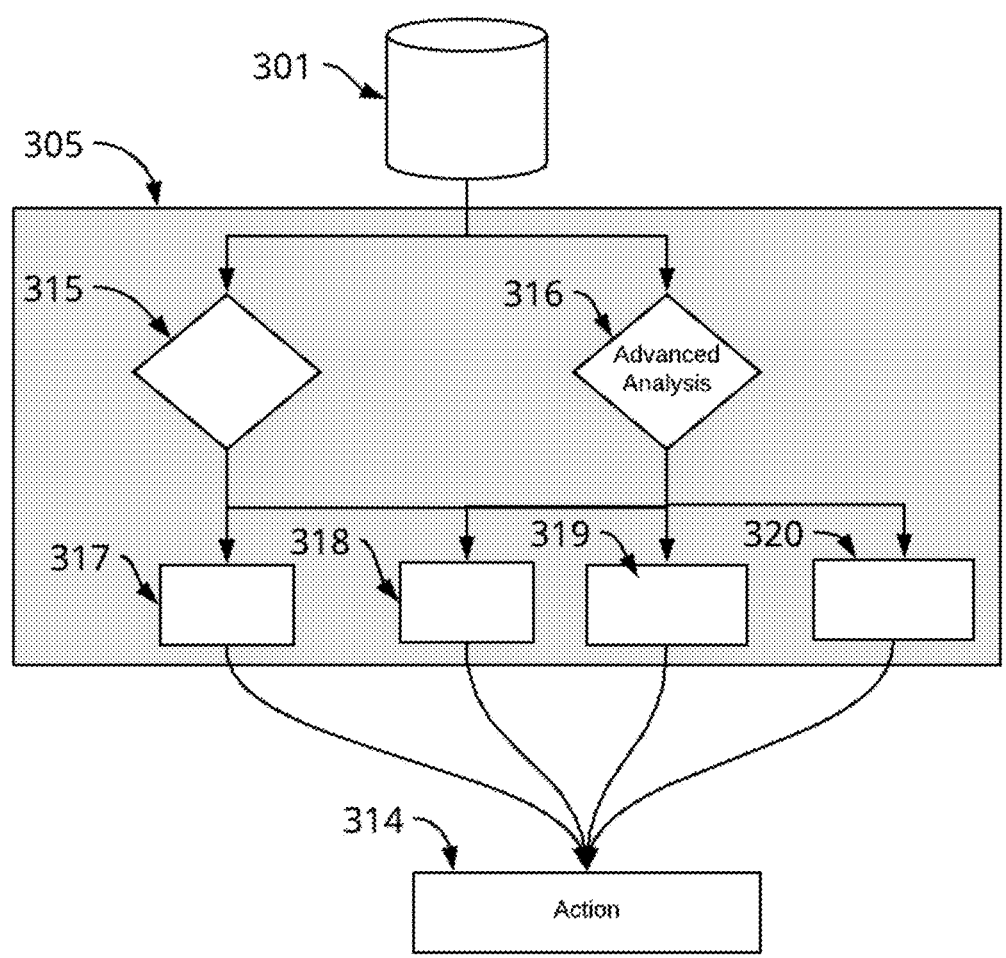
FIG. 5b schematically illustrates some data analysis capabilities in accordance with disclosed embodiments.

Embodiments of system 10 are capable of processing a large volume of data, and performing advanced analysis to create the most contextual and on-time decisions. For example, based on current data and historic data, there are opportunities to improve efficiencies and help anticipate alarm situations. This is achieved, for example, as shown in FIG. 5b, with an embodiment of analysis engine 306 having modules for advanced statistical analysis 316, statistical modeling 317, algorithms 318, artificial intelligence 319, and machine learning 320. For example, by analyzing the number of alarms, the system 10 can identify the fill rate of the container 100 in a specific location, or based on specific type of materials. Then, decisions can be anticipated when to schedule a pickup and a change of containers. In fact, such proactive decisions do not require intervention by a person, the system 10 makes calculations and schedules the desired actions 314 (e.g., pickup, exchange, empty, lock, etc.).

Figure 6:
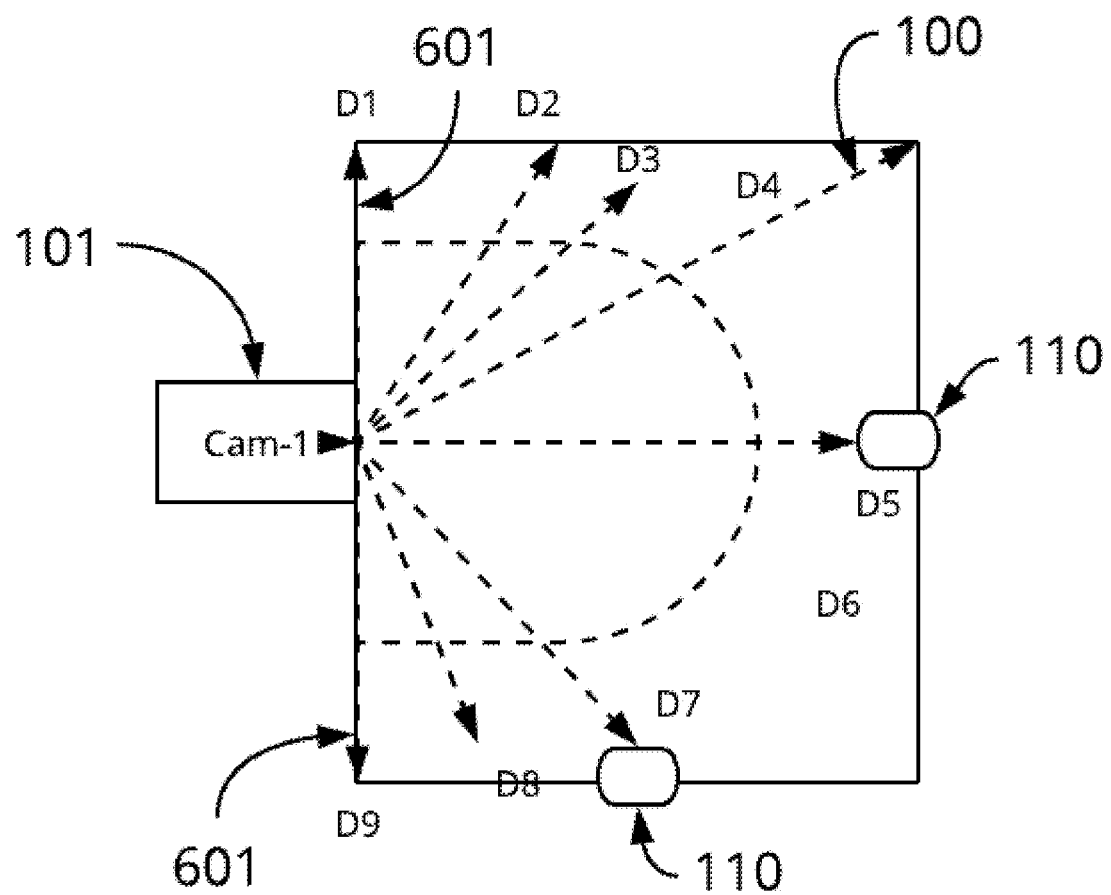
FIG. 6 schematically illustrates an embodiment of a camera in FIG. 2 with capability of collecting a wide range of video and picture as well as measuring distance in accordance with disclosed embodiments.

FIG. 6 schematically illustrates an embodiment of a camera 101 data collector with capability of collecting a wide range of video and pictures, as well as measuring distance in accordance with disclosed embodiments. For embodiments where the container 100 contains cameras 101 placed in different areas of the container 100, the space calculations can be calculated based on different angles of the object, image, and size relative to each camera's focal length, leading to an accurate estimation of space occupied and space left to be filled. Embodiments of camera 101 may capture visible light pictures (i.e., human viewable), or thermal images (i.e., infrared), or operate in other suitable spectra. As shown, each camera 101 has 180-deg picture capture capacity. It is also equipped with an appropriate measurement sensor (e.g., a laser rangefinder, or the like) to measure the distance anywhere within the camera's 101 field of view. The camera 101 can accurately measure multiple different distances as shown and described.

Upon setup within the container 100, the camera 101 measures one or more distances (D1-D9) and is calibrated either to certain known areas of the wall 601 of the container 100, or to targets or markers 110 placed at known distances, or to additional cameras 101. When the system 10 detects something blocking or interrupting a calibrated distance (D1-D9), (e.g., through image recognition modules 1120, interruption of a rangefinder, or the like) that is an indication that an object 108 is present (shown in FIG. 7).

Figure 7:
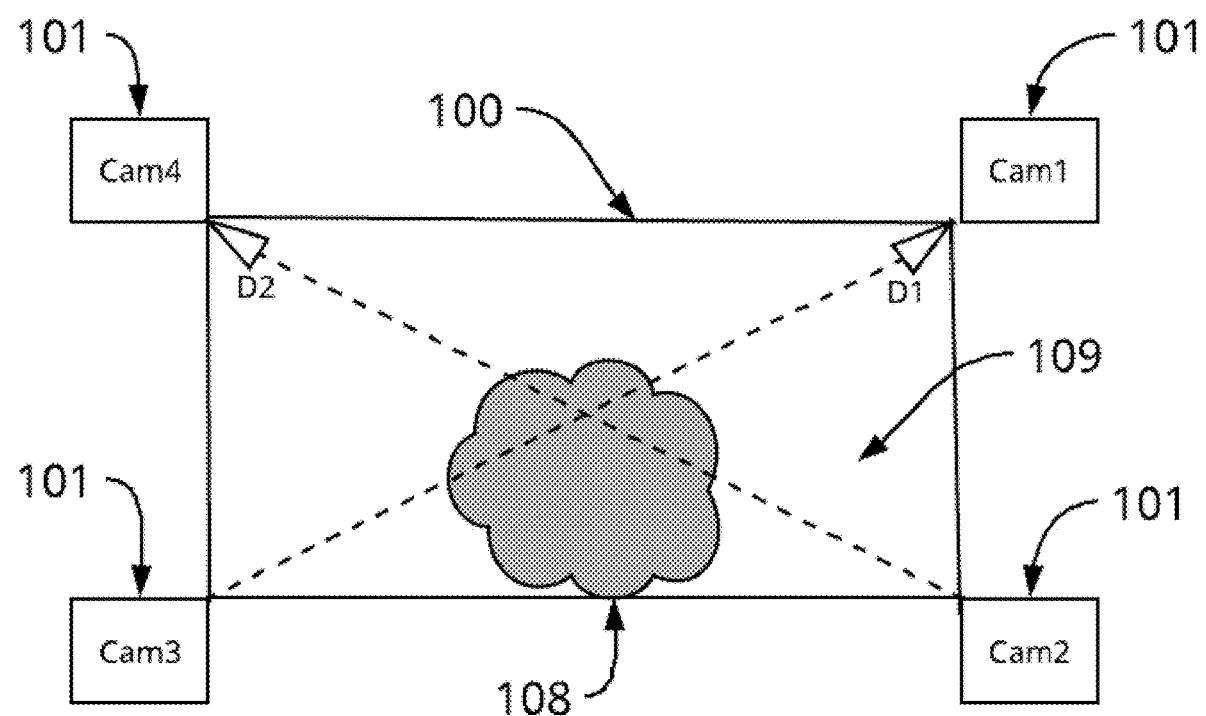
FIG. 7 schematically illustrates an embodiment whereby multiple cameras are placed inside a container.
Figure 8:
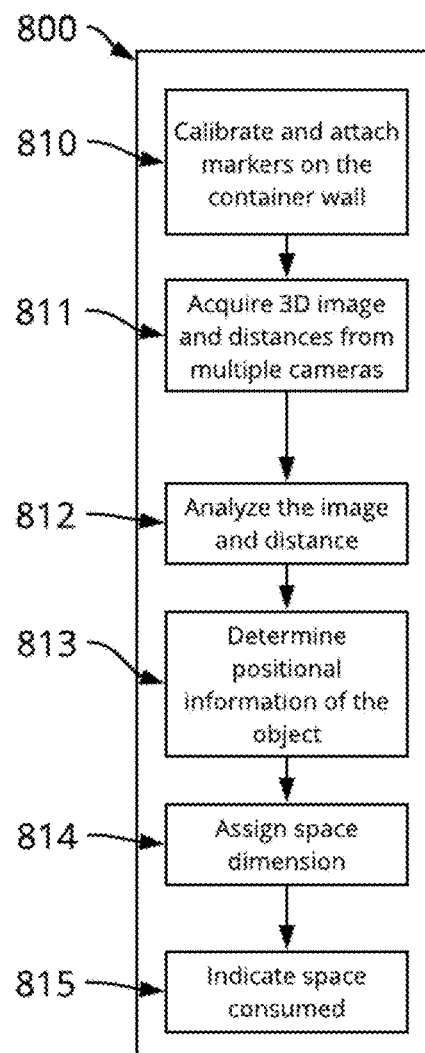
FIG. 8 is an exemplary flowchart showing a space analysis method using multiple data collectors, such as those in FIG. 7, in accordance with disclosed embodiments.
Figure 9:
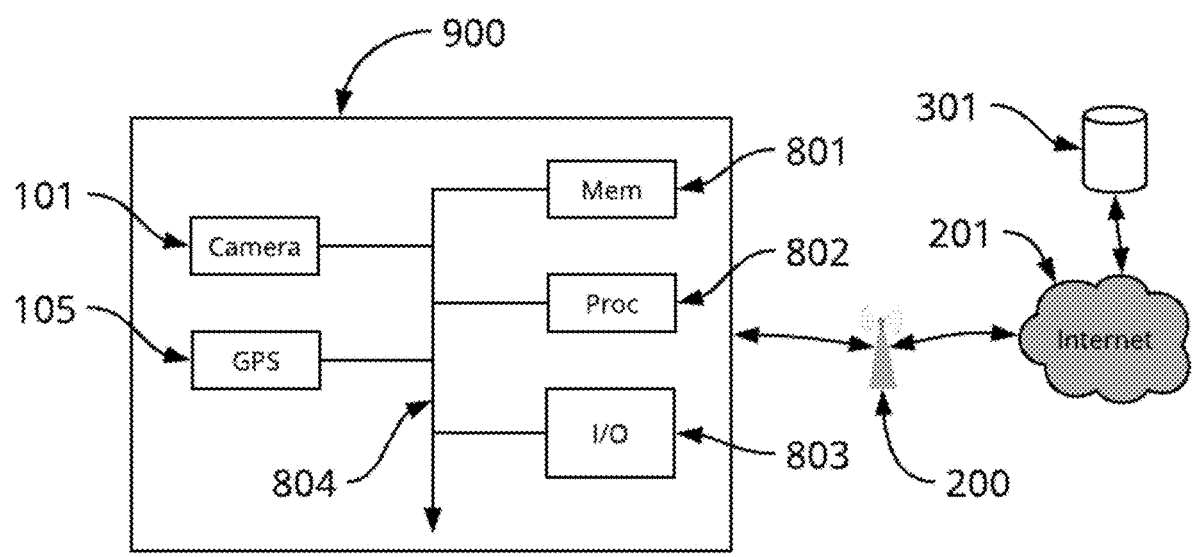
FIG. 9 schematically illustrates a portable space mapping device associated with collection of data and transmission of data in accordance with disclosed embodiments.

FIG. 8 is an exemplary flowchart showing a space analysis method 800 using multiple data collectors, such as the multiple cameras 101 shown in FIG. 7, in accordance with disclosed embodiments. As disclosed above, calibration of the cameras 101 occurs at 810 and may include attaching markers 110 to container 100 walls, or the like. At 811 measurements (e.g., D1-D9) from one camera 101, or from additional cameras 101 (e.g., Cam2-Cam4) may be used at 812 by analysis engine 306 to triangulate and find out at 813 the positional information of the object 108. From the positional information, a space dimension may be determined at 814 and an amount of space 109 occupied in the container may be determined at 815. Of course, one of ordinary skill in the art having the benefit of this disclosure will appreciate that the steps of method 800 may be performed in different orders, at different times, or the like.

In addition to the ability to map space 109 based on distance, the cameras 101, biometric readers 102, and diagnostic devices 103, also provide other images and data from inside container 100. Those images and data may be used (e.g., by image recognition module 1120) to recognize the image, and use that information as an alternative way of calculating the space inside the container, or take another action 314 (e.g., lock the container 100, etc.). Table 1 below shows sample code in [language?] with an image recognition routine and a calculation of the amount of space 109 taken by the object 108.

TABLE 1

```
public class Proc {
private static int picture_count = 0;
public static double findMarkerWidth(String imgPath){
Mat frame = Highgui.imread(imgPath);
Mat gscale = new Mat( );
Mat blur = new Mat( );
Mat edged = new Mat( );
// convert the image to grayscale, blur it, detect edges
if(frame.channels( )>1)
Imgproc.cvtColor(frame, gscale, Imgproc.COLOR_BGR2GRAY);
else
gscale = frame;
Imgproc.GaussianBlur(gscale, blur, new Size(5, 5), 0);
Imgproc.Canny(blur, edged, 35, 125);
// find the contours in the edged image and keep the largest one;
List<MatOfPoint> contours = new ArrayList<>( );
Mat hierarchy = new Mat(edged.width( ), edged.height( ),
CvType.CV_8UC1);
Imgproc.findContours(edged.clone( ), contours, hierarchy,
Imgproc.RETR_LIST, Imgproc.CHAIN_APPROX_SIMPLE);
int max_idx = 0;
// if any contours exist
if (hierarchy.size( ).height > 0 && hierarchy.size( ).width > 0)
{
double max_area = 0;
double area;
// find the contour with largest area
for (int idx = 0; idx >= 0; idx = (int) hierarchy.get(0, idx)[0])
{
area = Imgproc.contourArea(contours.get(idx));
if(area > max_area){
max_area = area;
max_idx = idx;
}
Imgproc.drawContours(frame, contours, idx, new Scalar(0, 0, 255));
}
byte[ ] bytes = new byte[ frame.rows( ) * frame.cols( ) *
frame.channels( ) ];
File file = new File(CameraActivity.activity.getExternalFilesDir(null),
"pic_contour"+ Integer.toString(pic_count) + ".jpg");
pic_count++;
Boolean bool = null;
String filename = file.toString( );
bool = Highgui.imwrite(filename, frame);
if (bool == true)
Log.d(LOG_TAG, "SUCCESS writing image to external storage");
else
Log.d(LOG_TAG, "Fail writing image to external storage");
Log.i(LOG_TAG, "Max Area: " + Double.toString(max_area));
}
else{
Log.e(LOG_TAG, "No Contour Found!");
}
MatOfPoint2f newPoint = new
MatOfPoint2f(contours.get(max_idx).toArray( ));
return Imgproc.arcLength(newPoint, true);
}
public static double distanceToImage(double focalLength,
double knownWidth, double pixelsPerWidth){
return (knownWidth * focalLength) / pixelsPerWidth;
} }
```

As disclosed herein, and shown in FIG. 1, a number of input/output devices (e.g., 400, 500, 600) may be used with system 10. These are the devices where the collected and analyzed data can be accessed by a user 700. These output devices include a computer 400, hand-held devices 500, mobile phones 600, and other devices, and in some embodiments may include data collectors (e.g., a camera 101, or the like).

Embodiments of system 10 may require a user 700 to log-in with multi-factor authentication to the software application through any of the output devices (400, 500, 600) to see the raw data, or post analysis data. Such data includes watching raw camera 101 video, or pictures for each of the containers 100, biometric readings, temperature readings, or weight readings. Post analysis data may be shown in form of tables, or graphically (e.g., as in FIG. 5a) depending on user's 700 preference. Also, user 700 can make additional changes to the existing container 100 configurations 311.

As disclosed herein, data collectors (e.g., 101, 102, etc.) may be mounted on the container 100, but additional embodiments allow the same measurements to be achieved using a portable device 900 which is composed of camera 101, GPS 105, transmitter 201, memory 801, processor(s) 802, input/output interfaces 803, and one or more communication busses 804 (e.g., a USB port, or the like) in a unitary form factor device 900. The portable device 900 may be used when the user 700 wants to get accurate information about any 3-dimension space such as space volume, load sizing, and other physical properties but the container 100 is not equipped with any of the data collectors, or transmitter 200.

In accordance with the portable device 900 embodiments, the user 700 places the portable device 900 inside the container 100 and they are able to collect, store, analyze the data in real-time. The data is also pushed to the server 300 via transmitter 200 to network 201 (e.g., the internet) and storage 301 for future reference or other applications. The user 700 then is able to make on-time decision based on the calculations and analysis.

For example, a user 700 may have some space 109 left in a shipping container 100. The user 700 can use the portable device 900 to accurately determine what load can fit in the remain space 109 based on dimensions, weight, etc., as guided by the input parameters and output analysis. Likewise, the user 700 can use portable device 900 to establish if a load outside the container 100 will in fact fit in the remaining space 109. Therefore, there is no longer trial and error, or time and energy wasted, associated with lack of accurate sizing information.

Figure 10:
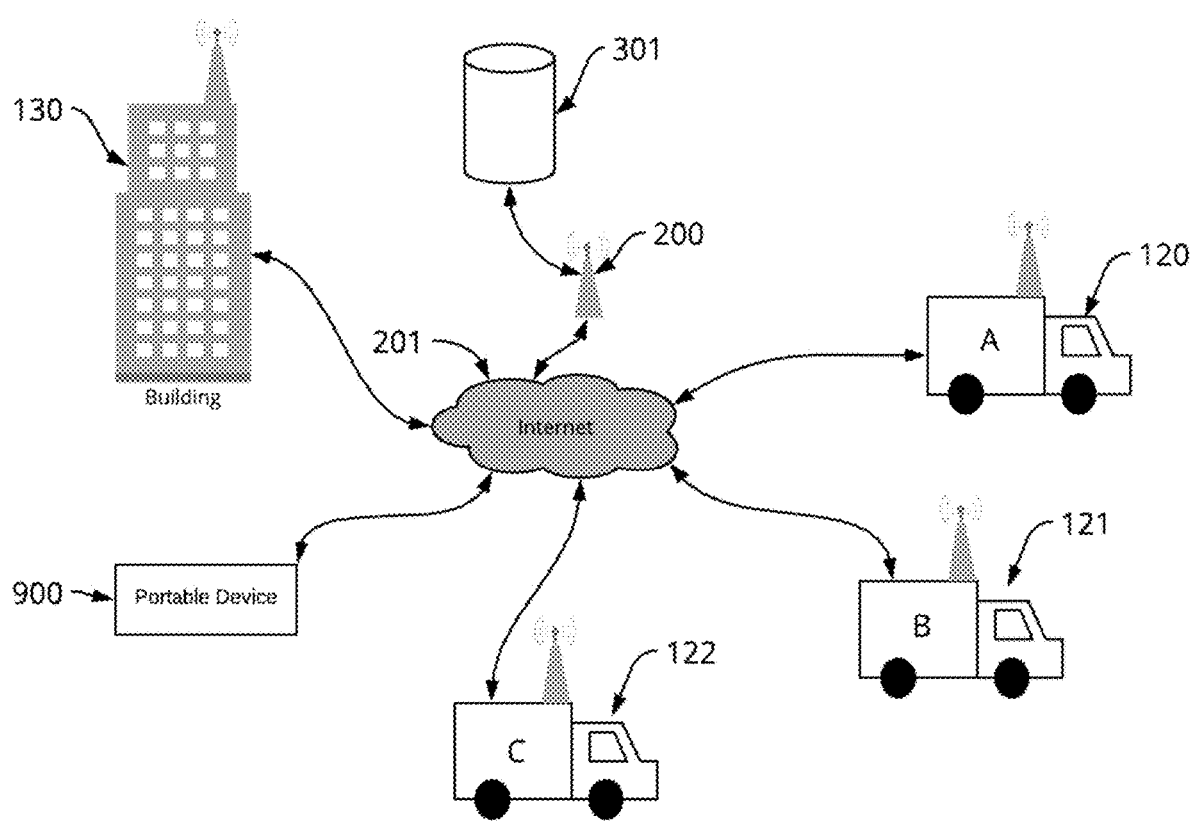
FIG. 10 schematically illustrates an embodiment of an integrated space mapping system with multiple sources of data and different types of containers in accordance with disclosed embodiments.

The system 10 can also be expanded to different types of containers 100 and can capture, organize, and help in decision making of multiple sources of data. As shown in FIG. 10, different data sources can include: container A 120, container B 121, container C 122, each located in different places, portable device 900, the data coming from space 109 inside a building 130, and other sources. For illustrative purposes, the system 10 may also have remote data storage 301 for backup.

Figure 11:
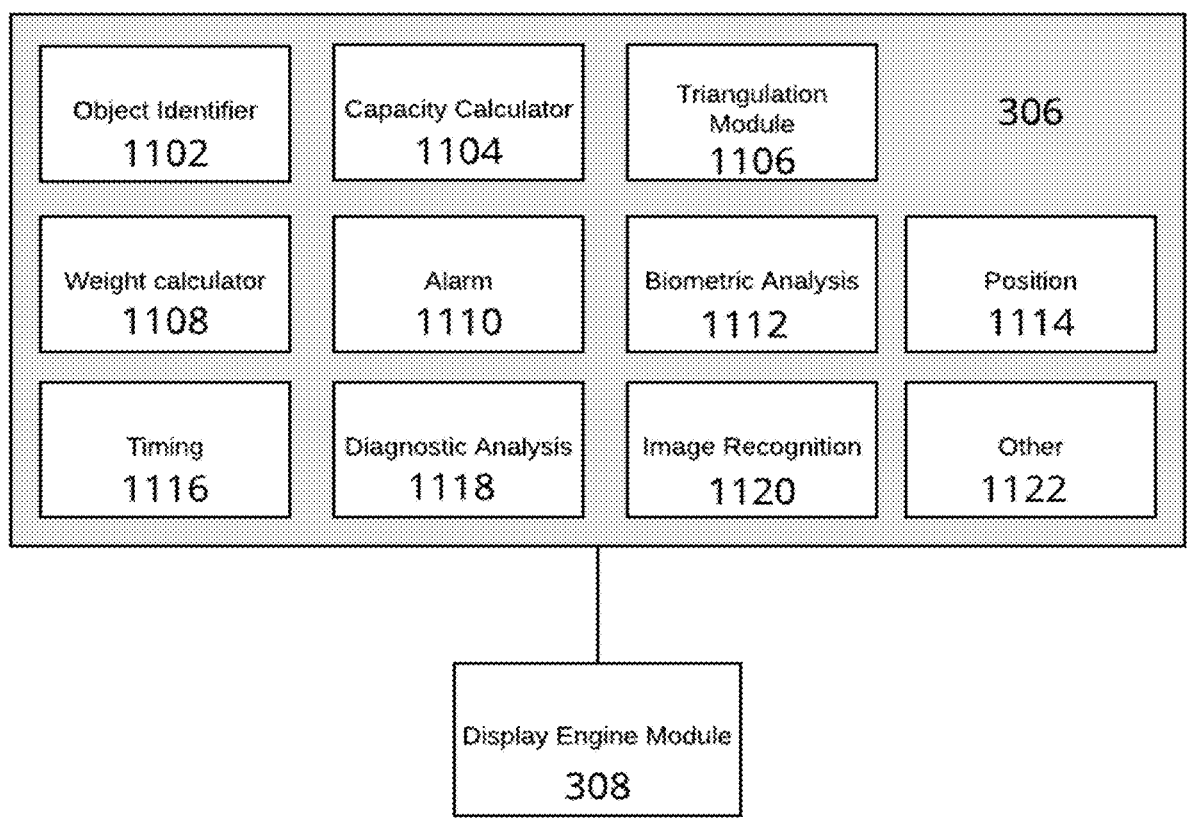
FIG. 11 is a schematic illustration of a physical attribute analysis engine 306 in accordance with disclosed embodiments.

FIG. 11 is a schematic illustration of a physical attribute analysis engine 306 in accordance with disclosed embodiments. As shown, and disclosed herein, analysis engine 306 may include one or more modules to cause a processor(s) to perform the herein described functions. As also disclosed herein, analysis engine 306 may be in communication with other system 10 modules, such as display engine module 308. As shown, analysis engine 306 may include an object identifier module 1102 for comparing linear distance measurements (e.g., D1-D9). Also included may be a capacity calculator 1104 for computing the occupied volume of the container 100. Also included may be a triangulation module 1106 for determining the location of objects 108 in the container 100. Also included may be a weight calculator 1108 that calculates of the container 100 and contents. Also included may be an alarm module 1110 for triggering various system 10 alarms. Also included may be a biometric analysis engine 1112 that identifies biological traits. Also included may be a real-time position location module 1114 that communicates with GPS 105 to locate the container 100. Also included may be a timing module 1116 for timing events within container 100 and providing a time stamp. Also included may be a diagnostic analysis engine 1118 that receives diagnostic data and processes the same. Also included may be a image recognition module 1120 that identifies objects 108 within container 100 based, at least in part, on images collected by the camera 101. Other modules 1122 may also be included.

Although various embodiments have been shown and described, the present disclosure is not so limited and will be understood to include all such modifications and variations are would be apparent to one skilled in the art.

What is claimed is:

1. A system for remote monitoring of a container, the system comprising:
    a first camera configured to collect data corresponding to a physical attribute of the container and further comprising an optical distance measurement sensor configured to measure a first linear distance to an object in a field of view of the first camera, and the data corresponding to a physical attribute of the container further comprises at least one measurement of the first linear distance;
    a second camera configured to collect data corresponding to a physical attribute of the container and further comprising an optical distance measurement sensor configured to measure a second linear distance to a second object in a field of view of the second camera, and the data corresponding to a physical attribute of the container further comprises the measurement of the second linear distance to the second object;
    a wireless transmitter in communication with the first camera and the second camera and configured to transmit the data corresponding to a physical attribute of the container to a location remote from the location of the container;
    a server in communication with the wireless transmitter to receive and process the data corresponding to a physical attribute of the container; and
    a physical attribute analysis engine in communication with the server to receive the data corresponding to a physical attribute of the container and calculate a current value for the physical attribute based upon the received data, the physical attribute analysis engine further comprising:
    an object identifier module that compares the at least one measurement of the first linear distance, and the measurement of the second linear distance to the second object, to a stored value corresponding to an empty container distance;
    a triangulation module that determines the location of the object by combining at least one measurement of the first linear distance and the measurement of the second linear distance to the second object; and
    a capacity calculator that computes the occupied volume of the container based at least in part on the comparison result of the object identifier and the determined result of the triangulation module.

2. The system of claim 1 further comprising:
    a display engine module in communication with the physical attribute analysis engine that receives the current value for the physical attribute and forwards the current value to at least one predetermined web address.

3. The system of claim 1 wherein the physical attribute analysis engine further comprises:
    an object identifier module that compares the at least one measurement of the first linear distance to a stored value corresponding to an empty container distance; and
    a capacity calculator that computes the occupied volume of the container based at least in part on the comparison result of the object identifier.

4. The system of claim 1 further comprising a global positioning system (GPS).

5. The system of claim 4 wherein the physical attribute analysis engine further comprises:
    a real-time position location module in communication with the global positioning system (GPS) for locating the geographical position of the container.

6. The system of claim 5 wherein the physical attribute analysis engine further comprises:
    a timing module for timing of events inside the container and providing a time-stamp.

7. The system of claim 1 wherein the physical attribute analysis engine further comprises:
    an image recognition module for identifying objects inside the container based on images collected by either of the first camera or the second camera.

8. A method for determining the volume capacity of a container, the method comprising:
    receiving data corresponding to a physical attribute of the container the received data comprising images from a camera;
    calculating a current value for the physical attribute based upon the received data by;
    optically measuring a linear distance to an object in a field of view of the camera, and the data corresponding to a physical attribute of the container further comprises at least one measurement of the linear distance;
    optically measuring a linear distance to a second object in a field of view of a second camera, and the data corresponding to a physical attribute of the container further comprises the measurement of the linear distance to the second object;
    comparing the at least one measurement of the linear distance, and the measurement of the linear distance to the second object, to a stored value corresponding to an empty container distance;
    determining the location of the object by combining at least one measurement of the linear distance and the measurement of the linear distance to the second object and computing the occupied volume of the container based at least in part on the comparison result and the determined location; and
    displaying the current value for the physical attribute.

9. The method of claim 8 wherein the method further comprises:
    comparing the at least one measurement of the linear distance to a stored value corresponding to an empty container distance; and
    calculating the occupied volume of the container based at least in part on the comparison result.

10. The method of claim 8 further comprising:
communicating with a global positioning system (GPS) to locate the geographical position of the container.

11. The method of claim 8 further comprising:
timing events inside the container and providing a timestamp.

12. The method of claim 8 further comprising:
identifying objects inside the container based on images collected by the camera.

* * * * *